United States Patent [19]
McKee et al.

[11] Patent Number: 5,529,797
[45] Date of Patent: Jun. 25, 1996

[54] METHOD FOR CONTINUOUSLY PRODUCING DISCRETE WRAPPED BAKED DOUGH PRODUCTS

[75] Inventors: O. D. McKee; Jack C. McKee; Ronnie L. Harden, all of Collegedale, Tenn.

[73] Assignee: McKee Foods Corporation, Collegedale, Tenn.

[21] Appl. No.: 301,984

[22] Filed: Sep. 6, 1994

[51] Int. Cl.⁶ ............................. A21C 9/08; A21C 15/00; A21D 8/06; A21D 15/00
[52] U.S. Cl. ..................... 426/410; 426/128; 426/414; 426/497; 426/505; 426/512; 426/523; 83/177; 83/932; 99/361
[58] Field of Search .................... 426/110, 128, 426/410, 414, 496, 497, 505, 512, 523; 83/177, 932; 99/354, 360, 361; 53/120, 466, 516

[56] References Cited

U.S. PATENT DOCUMENTS

| | | | |
|---|---|---|---|
| 2,179,672 | 11/1939 | Roys | 426/497 |
| 3,374,751 | 6/1965 | Werner | 426/496 |
| 3,787,597 | 1/1974 | Dryg et al. | 200/38 BA |
| 4,120,984 | 10/1978 | Richardson et al. | 426/412 |
| 4,604,947 | 8/1986 | Pavan | 99/353 |

FOREIGN PATENT DOCUMENTS

| | | |
|---|---|---|
| 2553330 | 4/1985 | France . |
| 2687090 | 8/1993 | France . |
| 9135830 | 8/1984 | Japan . |

OTHER PUBLICATIONS

Baking and Snack Magazine, Jan. 1993 pp. 14–17.
Baking and Snack Magazine, Dec. 1993 pp. 39–42.

*Primary Examiner*—Donald E. Czaja
*Assistant Examiner*—Curtis E. Sherrer

[57] ABSTRACT

A plurality of rolls of pliable backing material are fed through guides in which the configuration of the backing material is converted from flat to generally U-shaped strips. Unbaked dough is deposited into the strips as they feed forwardly toward a baking oven. The strips, filled with unbaked dough, are moved through the oven at a rate which enables the oven heat to bake the dough. When the strips, filled with baked dough, emerge from the oven, they are intermittently severed, advantageously by a high pressure stream of water, to create discrete baked products. These products are then conveyed for a time and distance sufficient to permit cooling, and are thereafter wrapped.

12 Claims, 5 Drawing Sheets

5,529,797

METHOD FOR CONTINUOUSLY PRODUCING DISCRETE WRAPPED BAKED DOUGH PRODUCTS

This invention relates to a method for continuously producing discrete wrapped and sealed baked dough products, such as muffins, loaves, slices, and the like, and in particular it relates to a method for producing such products baked in a separate backing layer.

In the past, certain types of baked dough products, such as muffins, rich brownies, sponge cakes, angel food cakes, and sweet breads, did not lend themselves very well to continuous mass production. Such items were customarily baked in pans, having separate depressions therein, in which the muffin dough was placed, prior to feeding the pans into a baking oven. The pans were then conveyed through the oven to bake the dough, then emptied to permit the separate muffins to be packaged.

The only prior art of which Applicant is aware which provides continuous production using some form of backing layer is U.S. Pat. No. 4,120,984 issued to Richardson et al on Oct. 17, 1978. This patent relates to a continuous process for baking foods in flexible plastic containers by sealing the container prior to baking, but providing a vent to permit the escape of steam and gas during the baking operation. Unlike the Richardson et al patent, however, the present invention does not seal any food in the package until baking and cooling are completed. Moreover, the Richardson et al patent provided a backing layer with cavities therein into which the dough was deposited.

Prior U.S. Pat. No. 3,787,597 to Dryg et al and U.S. Pat. No. 4,604,947 to Pavan disclosed the steps of baking a continuously extruded dough strip and thereafter cutting the baked strip into individual segments; however, neither Of these patents considered the use of any form of backing layer.

Therefore, prior to the advent of the present invention, it was not possible to use continuous feeding and baking techniques to produce baked dough products in a backing layer. It is, therefore, the primary object of the present invention to provide a new and improved method for continuously producing discrete wrapped and sealed baked dough products, each of which is provided with its own backing layer.

A further object of the invention is to permit the continuous production of loaves, slices, and other baked products which were heretofore produced in baking pans, without the need for such pans.

Other objects, advantages and salient features of the present invention will become apparent from the following detailed description, which, taken in conjunction with the annexed drawings, discloses a preferred embodiment thereof.

Figure 1:
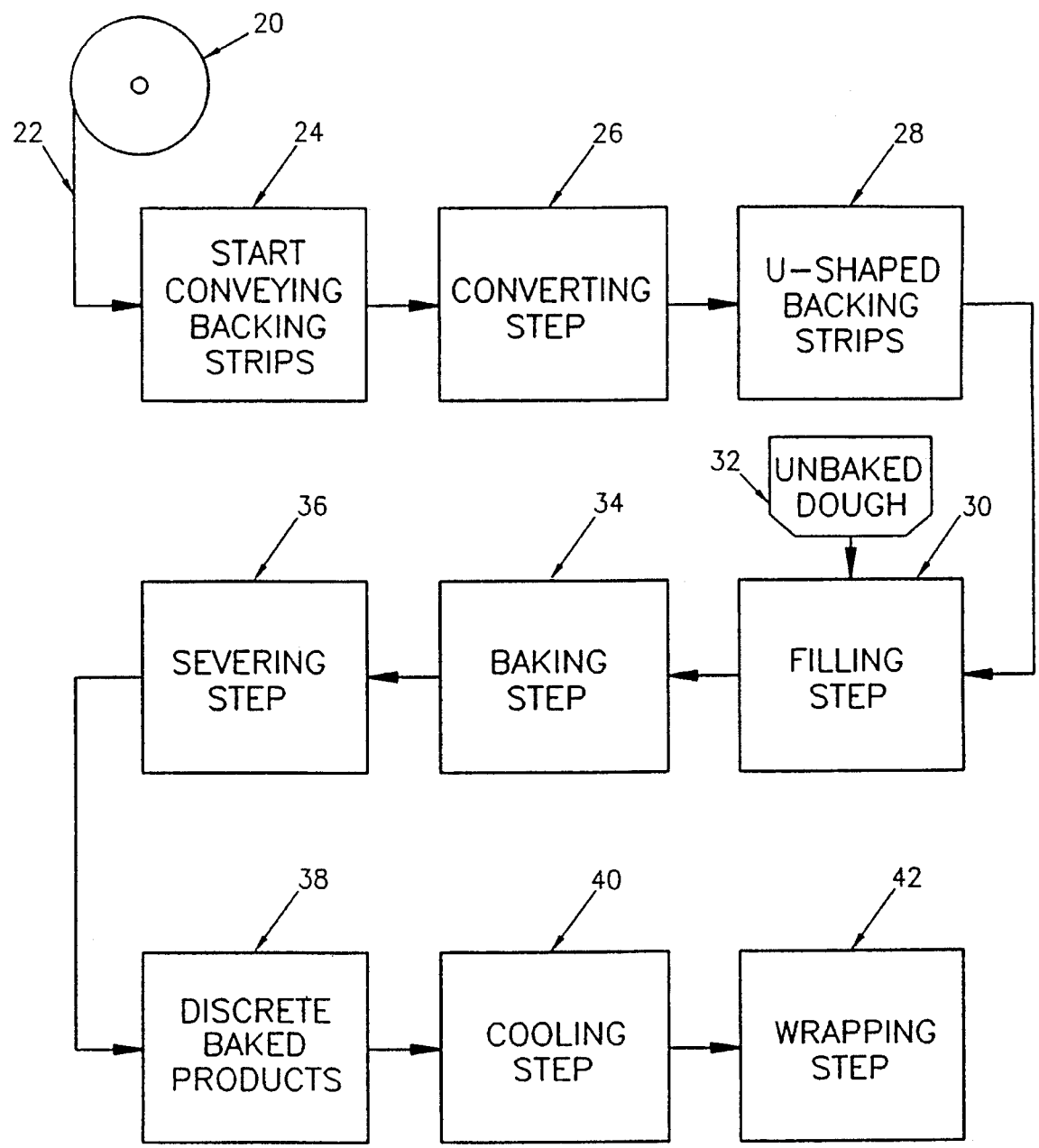
FIG. 1 is a diagrammatic flow chart showing the steps performed in the present invention.
Figure 2:
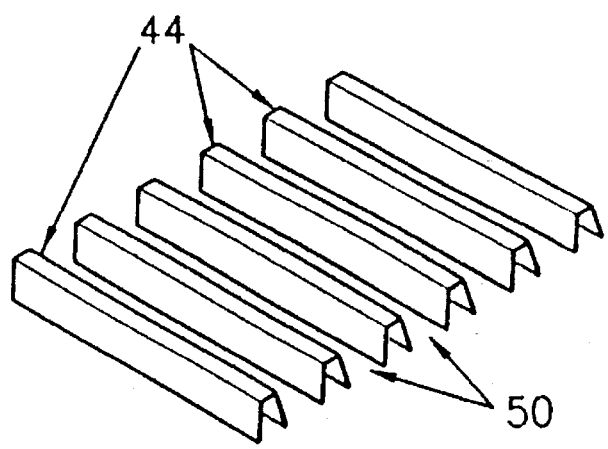
FIG. 2 is a perspective view of an exemplary form of rack, employed in the apparatus to practice the present invention.

Referring now to the drawings in further detail, FIG. 1 shows a diagrammatic view of the overall inventive process. A supply of pliable backing material is continuously fed from a supply thereof generally designated 20. It will be understood that the supply 20 consists of multiple rolls of flat sheet stock material 22.

A conveying means generally designated 24 draws the sheet material 22 from the rolls 20 thereof and feeds it longitudinally forwardly. The flat material 22 goes through a converting step generally designated 26 to form a supply of U-shaped backing strips generally designated 28. The term U-shaped refers to the cross-sectional configuration of the strips 28, which, in fact, are open-topped channels.

These strips are then passed through a filling step generally designated 30 wherein unbaked dough from a supply thereof, generally designated 32, is deposited into the U-shaped strips. The filled strips are then passed to a baking step generally designated 34 wherein the dough in the strips is properly baked. The baked strips are then subjected to a severing step generally designated 36 which converts the strips into discrete baked products generally designated 38. These baked products are then passed through a cooling step generally designated 40 and are finally passed to a wrapping step generally designated 42 in which the discrete products 38 are wrapped and sealed.

In order to accomplish the steps of the present invention, a series of guide rail members 44 divided by a series of spaced parallel channels 50. Although five such channels are shown, for purposes of illustration, it will be understood that the number of rails and channels may vary in the actual commercial practice of the invention. The guide rail members 44 can be aligned, end to end, and connected together by bolts or other conventional fastening means, not shown, for the purpose of providing an elongated guiding system upon which the converting, filling, and baking steps may be carried out A moving baking surface 46, such as a conventional feeding band, steel band or mesh conveyor, is positioned beneath the guide rail members 44.

Figure 3A:
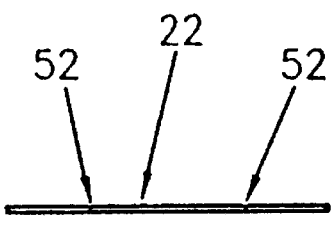
FIGS. 3A and 3B are transverse views showing how a backing strip is converted in the present invention.

A separate roll 20 of backing material is provided for each of the channels 50 and the guide rails 44 are positioned above the backing material. The backing material is advantageously FDA approved liner paper coated on one side with a release coating which acts as a moisture barrier and allows the cooled baked product to be separated from the backing strip without excessive sticking. As shown in FIG. 3A, the flat backing material 22 is provided with a pair of spaced longitudinally extending score lines 52. The material 22 is also advantageously fluted transversely, as can best be seen from FIG. 9 in which individual flutes 54 are arranged in a continuing series along the entire length of the backing material.

Each web of backing material 22 is drawn over an idler roll 56 by action of the conveying means 24, which is formed by a pair of juxtaposed feed rollers 58, 60 through which the backing material feeds. The feed rollers are aligned with a channel 50 and between the guide rail members 44 to assure that the backing material 22 feeds into the aligned channel.

Figure 3B:
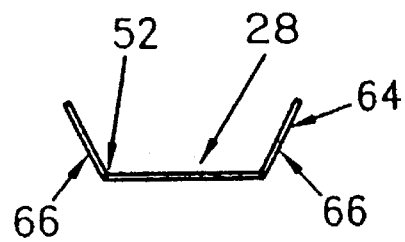
Figure 4:
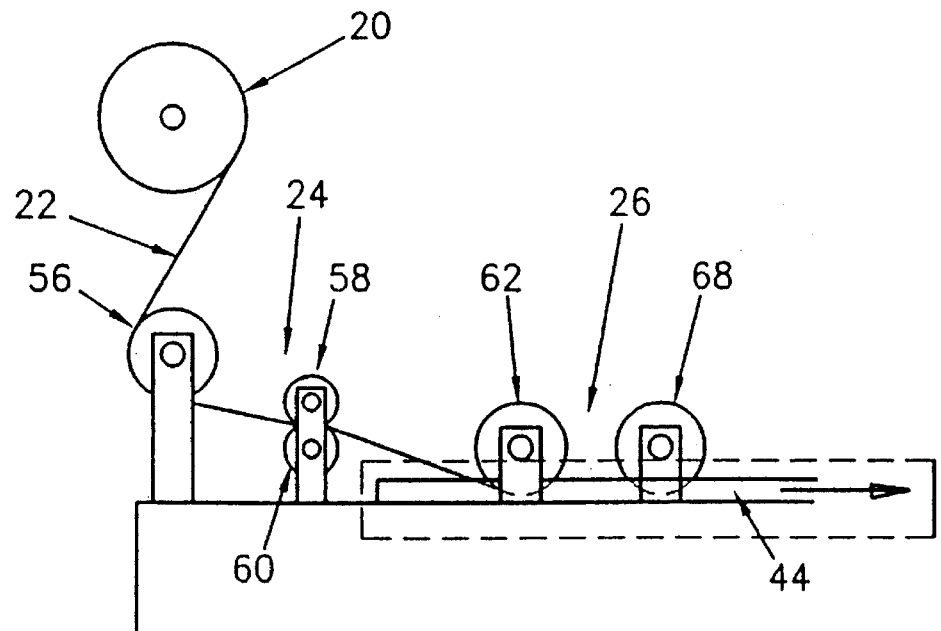
FIG. 4 is a longitudinal view of the apparatus for conducting the converting step.

The converting means 26 is formed by a plurality of spaced roller sets, having two longitudinally spaced rollers in alignment with, and descending partially into, each channel 50. The first roller 62 in each set converts the backing material 22 into a configuration as shown in FIG. 3B wherein the bottom portion 64 between the score lines 52 remains flat but the opposed sides 66 beyond the score lines are bent partially upwardly. The second roller 68 in each set converts the backing material from the configuration shown in FIG. 3A to that shown in FIG. 3B wherein the sides 66 are generally perpendicular to the bottom 64. This is the defined generally U-shaped configuration referred to herein, wherein the backing material, now formed into a backing strip, is an open-topped channel designated 70. The gradual nature of the converting step 26 is illustrated in FIG. 4.

Figure 5:
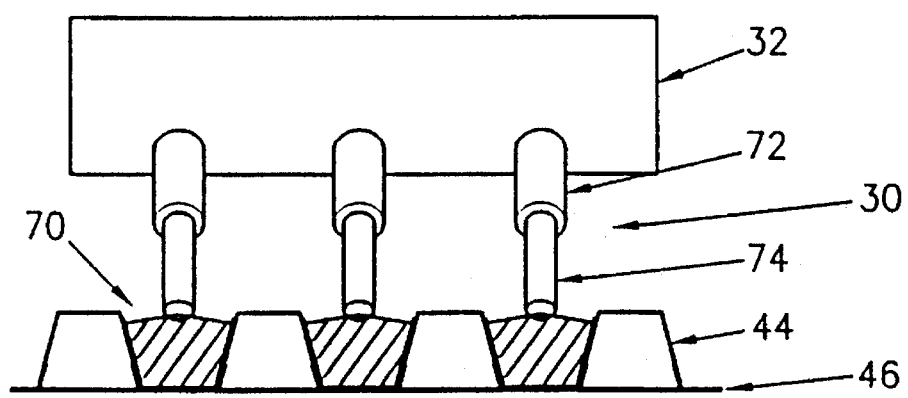
FIG. 5 is a transverse view of the apparatus for conducting the filling step.

At the conclusion of the converting step, each channel 50 in the guide rail means has a U-shaped backing strip 28, as shown in FIG. 3B, resting upon the moving baking surface 46, and feeding longitudinally forwardly under the action of the conveying means 24. The backing 8trips are then fed to the filling step, as shown in FIG. 5.

Dough depositor equipment is well known in the art and the details thereof do not form a part of the present invention. However, the dough depositor means necessarily includes the supply 32 of unbaked dough, feed hoses 72 projecting therefrom, and feed nozzles 74 on each hose. The nozzles 74 are aligned with one above each channel 50 to deposit unbaked dough material into the open-topped channels 70 formed by the backing strips 28.

Figure 6:
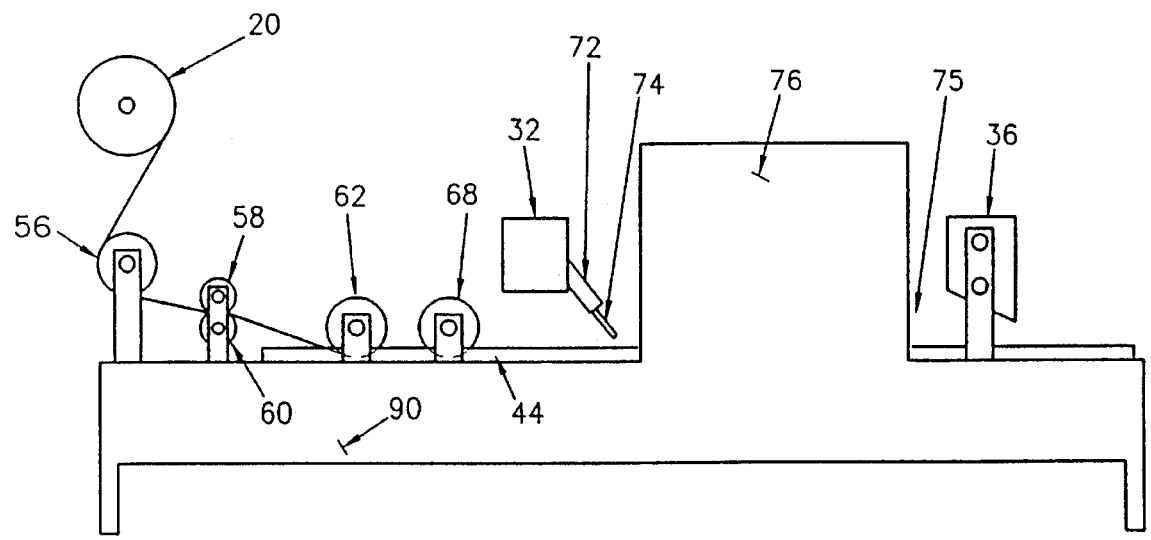
FIG. 6 is a side elevational view of the heating oven and related apparatus.

Thereafter, the backing strips, filled with unbaked dough, are subjected to the heating step 34. This consists of feeding these filled strips into and through a heating chamber in a conventional baking oven 76, as shown in FIG. 6. The speed at which the filled strips are conveyed, and the baking temperature with the oven 76, are coordinated to assure that the products will be properly baked as they emerge from the oven.

Figure 7:
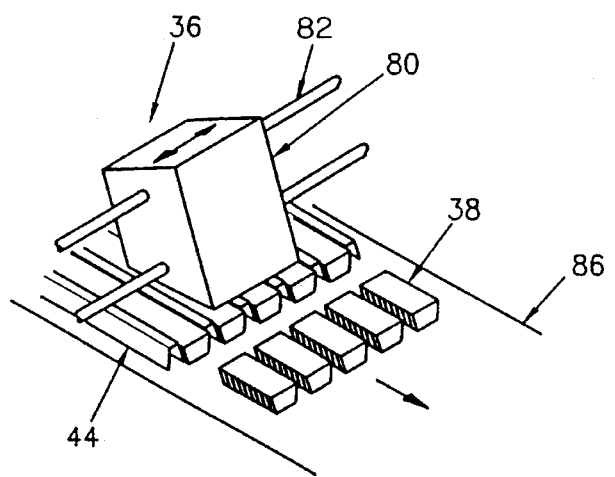
FIG. 7 is a perspective view of the apparatus for conducting the severing step.
Figure 8:
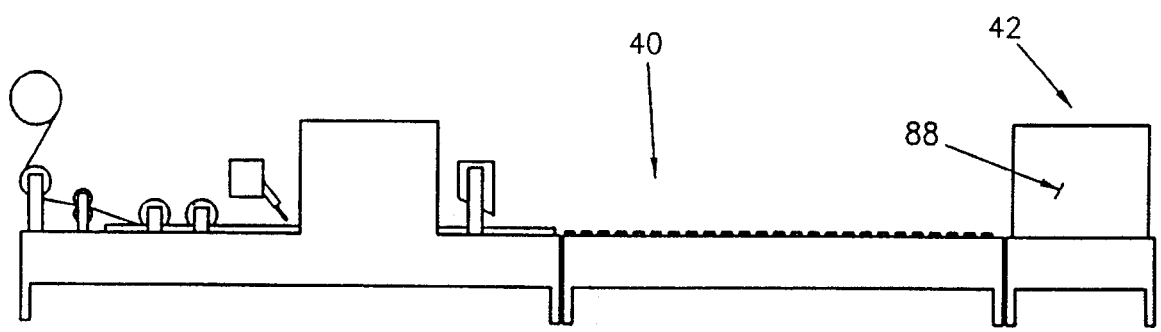
FIG. 8 is a side elevational view of the entire line for carrying out the method of the present invention.

At the outlet 75 from the oven 76, the severing step 36 is conducted by a severing mechanism 80 in the form of a transversely movable cutting mechanism slidably mounted upon a pair of transverse support rods 82. The severing mechanism advantageously consists of a device which directs a fine stream of water under high pressure downwardly to slice entirely through both the baked dough and its associated backing strip. As can be seen from FIG. 7, by the time the backing strips with the baked dough therein reach the severing mechanism 80, they have passed beyond the last of the guide rail members 44 and have fed onto a conveyor belt 86. This belt carries the backing strips filled with baked dough past the severing mechanism 80, whereat transverse movement of the severing means enables the water stream to separate the backing strips with the baked dough therein into discrete baked products 38.

Figure 9:
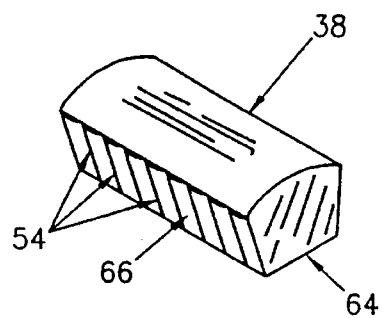
FIG. 9 is a perspective view of one of the discrete baked products prior to wrapping.

These discrete baked products 38 must then be conveyed by the belt for a distance and time to permit the baked dough to cool. This cooling takes place before the products 38 reach the wrapping step 42. The form of the discrete baked products by the time they reach the wrapping step 42 is best shown in FIG. 9. At this point, the dough has been able to rise and cool and the top surface of the baked product may well extend above the height of the walls 66 of the backing strip. Both ends of the product are completely exposed, but the bottom and sides are contained within the backing strip.

The wrapping step is accomplished by any conventional form of wrapping machine 88, which simply wraps and seals the discrete baked products 38 with an appropriate wrapping material. The details of the machine 88 do not form any part of the present invention and there are many commercial brands of wrapping machines which are fully capable of receiving the discrete products in the conveyor 86 and wrapping and sealing them so they are ready for shipment and commercial sale.

In prototype operations of the present invention, the guide rail members 44 have been produced in four foot lengths and have been locked onto the frame 90 of the baking oven. The various rollers 58, 60, 62 and 68, as well as the support for the severing mechanism 80, also supported by attachment to the frame 90, as shown in FIG. 6. A multi-head, multi-purpose spot depositor was used as the filling machine for the unbaked dough. The baking oven 76 was a zone oven.

The U-shaped backing strips filled with baked dough left the oven and reached the severing mechanism 80, with the temperature elevated from the baking process. The severing was accomplished by the high pressure water stream or jet located immediately adjacent to the outlet from the baking oven, thereby assuring that the severing occurred while the baked dough was still warm. This arrangement enabled any excess water from the severing step to evaporate during the time that the discrete baked dough products were cooling, thus eliminating any spoilage problems which the excess water might otherwise create after the products were wrapped. The discrete severed baked products were then allowed to cool for a sufficient period of time so that when they arrived at the wrapping machine, the temperature had dropped sufficiently to permit the products to be wrapped.

After reading the foregoing detailed description, those skilled in the art will recognize that various changes or modifications may be made without departing from the spirit and scope of the present invention, as defined in the appended claims.

What is claimed is:

1. A method for continuously producing discrete wrapped baked dough products, each having its own associated backing material, which comprises the steps of:

provided a baking oven having an internal temperature sufficient to bake dough;

providing a flat conveyor movable through the baking oven;

providing a continuous supply of flat pliable backing material;

feeding said backing material onto said conveyor to enable the conveyor to transport the backing material toward and through the baking oven;

providing forming means capable of converting the configuration of the backing material without converting the configuration of the conveyor;

positioning the forming means before the baking oven;

passing the backing material through the forming means to convert the configuration of the backing material from flat to generally U-shaped as said backing material is being transported by the flat conveyor;

providing a supply of unbaked dough;

depositing a continuous stream of unbaked dough from said supply into said U-shaped backing material as said backing material is being conveyed by the flat conveyor;

conveying the U-shaped backing material, filled with unbaked dough, through the baking oven, upon the flat conveyor, to enable the dough to be baked by the heat of the oven;

providing a severing means after the baking oven;

conveying the U-shaped backing material, with the baked dough therein, past the severing means;

intermittently operating said severing means to slice through said baked dough and backing material to create discrete baked products;

cooling said baked products for a time sufficient to enable the temperature thereof to drop; and wrapping said cooled baked products to form discrete wrapped baked dough products.

2. A method as defined in claim 1 wherein a plurality of separate backing materials are provided and wherein said ensuing steps are conducted on a plurality of backing materials.

3. A method as defined in claim 2 including the further step of guiding said plurality of backing materials so they are conveyed in side-by-side relationship.

4. A method as defined in claim 1 wherein said step of severing is conducted transversely of the direction in which said backing material, filled with baked dough, is being conveyed.

5. A method as defined in claim 4 wherein said severing means comprises a device for directing a fine stream of high pressure water at the baked dough and backing material to cut completely therethrough.

6. A method as defined in claim 5 wherein said severing means is located directly adjacent to the baking chamber to perform the severing step prior to cooling of said baked dough.

7. A method as defined in claim 1 wherein said wrapping step comprises placing a wrapper entirely around said cooled baked dough products and sealing said wrapper.

8. A method for continuously producing discrete wrapped and sealed baked dough products, each with its own backing strip, which comprises the steps of:

positioning a plurality of separate rolls of generally flat pliable backing material in side-by-side juxtaposed position;

providing a series of guide tracks, one for each strip of backing material fed from a roll thereof;

positioning a continuously operating conveying means adjacent to said guide tracks;

feeding said backing material strips to said conveying means to permit said conveying means to continuously feed said backing material strips from said rolls thereof toward said guide tracks;

providing a forming means capable of converting the configuration of said backing material strips;

feeding said backing material strips past said forming means to convert the configuration of said backing material strips from flat to generally U-shaped, thereby providing a plurality of continuously feeding open-topped channels formed by said backing strips;

positioning said U-shaped backing strips within said guide tracks;

providing a supply of unbaked dough;

dispensing a plurality of streams of unbaked dough from the supply thereof into said open-topped channels formed by said backing strips;

providing a baking means having an internal chamber with a temperature adequate to bake said unbaked dough;

continuously feeding said backing strips filled with unbaked dough through said internal chamber at a speed sufficient to enable said backing strips filled with unbaked dough to remain within said internal chamber for a time sufficient to accomplish the desired baking of the dough:

providing a severing means downstream of said baking means;

operating said severing means intermittently to cut through said baked dough and backing strips and thereby create a plurality of discrete bake dough products, each within its own backing strip;

cooling said discrete baked dough products to enable the baked dough to cool sufficiently to permit the baked dough products to be wrapped; and wrapping each of said discrete baked dough products to form a plurality of individual baked dough products, each with its own backing strip.

9. A method as defined in claim 8 wherein the severing means operates transversely of the direction of feed of said backing strips filled with baked dough.

10. A method as defined in claim 9 wherein said severing means accomplishes the severing step by directing a fine stream of high pressure water downwardly toward said backing strips filled with baked dough.

11. A method as defined in claim 10 wherein said severing step is accomplished immediately adjacent to said baking chamber and before said baked dough has had an opportunity to cool.

12. A method as defined in claim 8 wherein said cooling step comprises conveying said baked dough products over a distance, and at a speed, sufficient to enable the temperature of said dough products to drop to the desired level for the wrapping step.

* * * * *